(12) United States Patent
Denby et al.

(10) Patent No.: US 7,688,758 B2
(45) Date of Patent: Mar. 30, 2010

(54) NODE MERGING PROCESS FOR NETWORK TOPOLOGY REPRESENTATION

(75) Inventors: Lorraine Denby, Berkeley Heights, NJ (US); Jean Meloche, Madison, NJ (US); Balaji Sathyanarayana Rao, Somerville, NJ (US); John R. Tuck, Jr., Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 287 days.

(21) Appl. No.: 11/768,442

(22) Filed: Jun. 26, 2007

(65) Prior Publication Data
US 2009/0003238 A1    Jan. 1, 2009

(51) Int. Cl.
*H04L 12/28* (2006.01)
(52) U.S. Cl. ..................................... 370/254
(58) Field of Classification Search ........................ None
See application file for complete search history.

(56) References Cited

U.S. PATENT DOCUMENTS

| 7,031,264 | B2 | 4/2006 | Adhikari et al. | |
|---|---|---|---|---|
| 7,243,313 | B1* | 7/2007 | Qin et al. | 716/2 |
| 2003/0086425 | A1 | 5/2003 | Bearden et al. | |
| 2003/0091165 | A1 | 5/2003 | Bearden et al. | |
| 2003/0097438 | A1* | 5/2003 | Bearden et al. | 709/224 |
| 2004/0062204 | A1 | 4/2004 | Bearden et al. | |
| 2004/0252694 | A1 | 12/2004 | Adhikari et al. | |
| 2005/0053009 | A1 | 3/2005 | Denby et al. | |
| 2005/0207410 | A1 | 9/2005 | Adhikari et al. | |
| 2006/0031055 | A1* | 2/2006 | Sheehan | 703/14 |
| 2007/0097883 | A1* | 5/2007 | Liu et al. | 370/254 |
| 2008/0056163 | A1* | 3/2008 | Chan et al. | 370/255 |
| 2008/0189353 | A1* | 8/2008 | Gray et al. | 709/202 |

OTHER PUBLICATIONS

U.S. Application Serial No. 11/531,910 filed in the name of L. Denby et al. On Sep. 14, 2006 and entitled "Data Compression in a Distributed Monitoring System.".
U.S. Application Serial No. 11/496,360 filed in the name of B. Karacali-Akyamac et al. On Jul. 31, 2006 and entitled "Determination of Endpoint Device Location for Efficient Analysis of Network Performance.".

* cited by examiner

*Primary Examiner*—Chirag G Shah
*Assistant Examiner*—Amarnauth Persaud
(74) *Attorney, Agent, or Firm*—Joseph B. Ryan; Jason Paul DeMont; Wayne S. Breyer

(57) ABSTRACT

Node merging methods and apparatus are disclosed for generating simplified representations of network topology. A first topology representative of a given network is determined, and at least one pair of nodes of the first topology is merged into a single node based on measures associated with respective edges connecting the nodes of the node pair to at least one neighbor node common to that pair. The merging step is repeated for one or more additional pairs of nodes to produce a reduced network topology meeting one or more desired criteria, and a visualization or other representation of the reduced network topology is generated.

19 Claims, 3 Drawing Sheets

FIG. 3

```
Let N(n) be the list of neighbors of a node n
def merge(threshold):

loop 1: for each edge with a statistic below WAN threshold
            denote by n1 and n2 the nodes surrounding this edge skip edge(n1, n2) if n1 is an endpoint
            skip edge(n1, n2) if n2 is an endpoint

#
            # Now we verify whether it is ok to merge n1 and n2
            #
            loop 2: for each node n3 in N(n1) + N(n2)

if n3 is a neighbor to both n1 and n2 if the edge(n1, n3) is above threshold
                                    n1 and n2 will not be merged
                                    break out of loop 2 and continue loop 1 if the edge(n2, n3) is above threshold
                                    n1 and n2 will not be merged
                                    break out of loop 2 and continue loop 1 merge n1 and n2 into new node n0

#
            # Now we define statistics between the newly formed node and
            # the other ones loop 3: for each node n3 in N(n1) + N(n2)
                            define the statistic between n3 and n0 as the
                            maximum of the statistics for the edges edge(n1, n3)
                            and edge(n2, n3), at least one of which exists go back to loop 1
```

NODE MERGING PROCESS FOR NETWORK TOPOLOGY REPRESENTATION

FIELD OF THE INVENTION

The invention relates generally to communication networks, and more particularly to techniques for processing information representative of network topology.

BACKGROUND OF THE INVENTION

As is well known, the topology of a given communication network may be generally represented as comprising nodes interconnected by edges. The nodes may represent network elements such as, for example, routers, switches and gateways, while the edges represent connections between such elements. Information specifying a network topology may be stored in the form of a designated data structure, such as a list of nodes and a corresponding adjacency matrix specifying connections between the nodes.

Network topology information is useful in a wide variety of applications, including applications that involve network analysis associated with implementation, maintenance, management, monitoring or troubleshooting of communication networks. As a more particular example, it is often desirable to generate a visualization of the topology of a given communication network. Such visualizations may be generated for presentation on a computer monitor or other type of display.

Large network topologies can be very difficult to visualize and interpret. For example, the physical constraints of the display may limit the number of nodes and edges that can be effectively presented. In addition, it may be difficult to recognize important features of the network topology when the topology also includes many unimportant nodes and edges. The speed at which network engineers can interact with the topology visualization is directly related to the number of nodes and edges of the topology.

Certain conventional topology visualization techniques attempt to facilitate the identification of features of interest by, for example, coloring particular edges in the visualization as presented on a color display. For example, edges colored red may indicate potential problem locations, while edges colored green indicate normal operation. This coloring process is typically based on lengthy calculations, and so can be difficult to implement with large network topologies. Other conventional approaches allow the topology visualization to be modified to present only a subset of the topology based on, for example, a designated number of hops from a particular node, or traffic carried between selected zones.

The conventional approaches noted above fail to provide an adequate mechanism for automatically simplifying the visualization so as to present only particular portions of interest. For example, a network engineer may need to understand what happens in a wide area network (WAN) portion of a large enterprise network topology. Unfortunately, the conventional techniques are unable to simplify a network topology visualization such that it automatically presents only those nodes and edges likely to represent WAN components of the network.

Accordingly, a need exists for an improved approach to network topology processing, which allows for efficient and automatic simplification of network topology visualization to present only WAN components or other particular portions of interest, as well as improved performance in other applications.

SUMMARY OF THE INVENTION

The present invention in one or more illustrative embodiments provides a node merging process for use in generating simplified visualizations of network topology and in numerous other network topology applications.

In accordance with an aspect of the invention, a first topology representative of a given network is determined, and at least one pair of nodes of the first topology is merged into a single node based on measures associated with respective edges connecting the nodes of the node pair to at least one neighbor node common to that pair. The merging step is repeated for one or more additional pairs of nodes to produce a reduced network topology meeting one or more desired criteria, and a representation of the reduced network topology generated. For example, a visualization of the reduced network topology may be generated. Additionally or alternatively, various types of network analysis may be performed using the generated representation.

In an illustrative embodiment, the first topology is determined by running a route tracing program at one or more network elements. Of course, a wide variety of other sources of initial network topology information may be used in implementing a given embodiment of the present invention. The measures associated with the respective edges may comprise, for example, delay, loss, jitter or type of service measures determined using the route tracing program or any other source of network topology information. In other embodiments, alternative statistics or other measures may be associated with the respective edges and utilized to determine if a given pair of nodes should be merged.

The node merging process in the illustrative embodiment automatically merges a given one of the node pairs into a single node if the nodes of the given node pair do not share at least one common neighbor node. Furthermore, a given one of the node pairs is merged into a single node only if all edges connecting the nodes of the given node pair to any neighbor nodes common to that node pair have corresponding measures less than a specified threshold. Thus, a given one of the node pairs is not merged into a single node if at least one edge connecting a node of the given node pair to any neighbor node common to that node pair has a corresponding measure greater than or equal to the specified threshold. The specified threshold may comprise, for example, a WAN threshold which separates network components likely to be associated with a WAN from those not likely to be associated with a WAN.

In accordance with another aspect of the invention, when nodes of a given node pair are merged into a single node, any edges between the merged nodes and one or more remaining nodes are removed from the corresponding topology and one or more new edges are formed in a modified topology between the one or more remaining nodes and the new node. A measure is determined for association with a given new edge as a maximum of associated measures of respective edges that are replaced by the new edge.

Advantageously, the present invention in the illustrative embodiments provides an improved approach to generation of network topology representations. This approach is simple and efficient, and can accurately simplify a given network topology to present, for example, only those portions of the network likely to be associated with WAN components.

BRIEF DESCRIPTION OF THE DRAWINGS

FIG. 3 shows an exemplary set of pseudocode for implementing a node merging process of the type shown in FIG. 1.

DETAILED DESCRIPTION OF THE INVENTION

The invention will be illustrated below in conjunction with various arrangements associated with an exemplary node merging process for generating simplified representations of network topology. It should be understood, however, that the invention is not limited to use with any of these particular illustrative arrangements. For example, although the disclosed techniques are particularly well-suited for use in generating simplified visualizations of network topology, those skilled in the art will recognize that these techniques may be adapted for use in any type of application that can benefit from a reduced network topology.

The term "network topology" as used herein is intended to be construed broadly, so as to encompass any type of representation comprising nodes and edges. A given network topology may thus represent the topology associated with a particular network layer, such as Layer 3, but may alternatively include other layers or combinations of layers, as well as various network types or combinations thereof.

Figure 1:
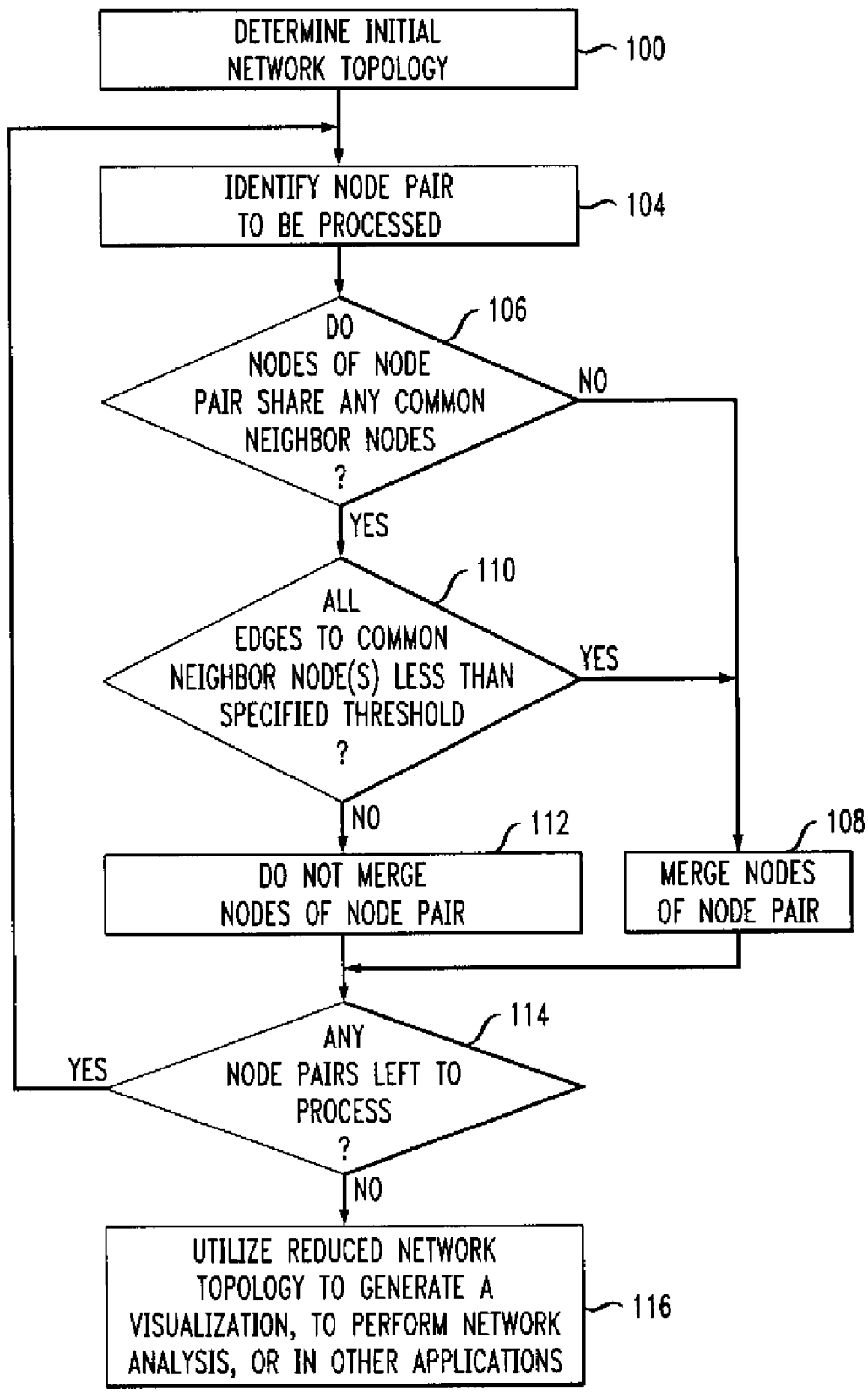
FIG. 1 is a flow diagram of an exemplary node merging process for generating a simplified representation of network topology in an illustrative embodiment of the invention.

Referring now to the flow diagram of FIG. 1, a node merging process for generating a simplified representation of network topology is shown. This process may be implemented in the form of one or more software programs that are executed by at least one processing element within or otherwise associated with a network. Such a processing element may comprise, for example, a network analysis device coupled to a router or other network element, or a portion of a router or other network element. Additional details regarding exemplary network element configurations will be described below in conjunction with FIGS. 2 and 4.

In step 100, an initial network topology is determined for a given communication network or portion thereof. By way of example, the initial topology may be determined using a route tracing program such as, for example, the well-known traceroute program, also referred to as the traceroute utility. The traceroute program traces the hops on a route from a source to a destination using the Time-To-Live (TTL) field of transmitted packets. Running the traceroute program at one or more nodes of a network can thus be used to determine network topology and to associate measures such as delay with edges that interconnect nodes within the topology.

Measures indicative of other types of performance data, such as loss, may be used in other embodiments. The term "measure" as used herein is intended to be construed broadly, and to encompass delay, loss, jitter, type of service or any other statistic that may be associated with a given edge.

Also, it should be noted that an initial topology may be determined using any source of network topology information, including well-known conventional protocols such as Simple Network Management Protocol (SNMP) or Open Shortest-Path First (OSPF) interior gateway protocol, or network monitoring and analysis systems such as the ExpertNet™ network assessment tool from Avaya Inc. of Basking Ridge, N.J., U.S.A. Other exemplary techniques for generating network topology information are disclosed in U.S. Patent Application Publication No. 2004/0252694, entitled "Method and Apparatus for Determination of Network Topology," and U.S. Patent Application Publication No. 2005/0207410, entitled "Automatic Determination of Connectivity Problem Locations or other Network-Characterizing Information in a Network Utilizing an Encapsulation Protocol," both of which are commonly assigned herewith and incorporated by reference herein. Thus, it is to be appreciated that a wide variety of different sources of initial network topology information may be used in implementing a given embodiment of the present invention.

Steps 104 through 114 of FIG. 1 generally involve an iterative merging of node pairs so as to produce a reduced network topology suitable for providing, by way of example, a desired simplified visualization or analysis. Starting with the network topology determined in step 100, a first pair of nodes is identified for processing in step 104. This could be any pair of nodes associated with a given edge, and may be selected arbitrarily. In the illustrative embodiment, pairs of nodes to be considered for merging may be identified, for example, as those nodes on respective ends of an edge having a delay measure or other associated measure below a specified threshold. Different edges with associated measures may be examined in turn, and their corresponding node pairs processed in the manner shown in FIG. 1. Other techniques can be used to identify the particular node pairs to be processed.

Step 106 determines if the nodes of the node pair identified in step 104 share any common neighbor nodes. If not, the nodes of the node pair are automatically merged into a single node, as indicated in step 108. If the nodes of the identified node pair do share at least one common neighbor node, the process moves to step 110 as shown.

In step 110, a determination is made as to whether all edges connecting the nodes of the identified node pair to any common neighbor nodes have associated measures that are less than a specified threshold. As indicated above, the traceroute program may be used to associate measures such as delay or loss with respective edges. Alternatively, any other source of network topology information may be used. Numerous techniques for generating measures and associating such measures with respective edges of a network topology are well known to those skilled in the art and will therefore not be further described herein.

If all edges connecting the nodes of the given node pair to any neighbor nodes common to that pair have corresponding measures less than a specified threshold, the nodes of that node pair are merged into a single node in step 108.

If the determination in step 110 is negative, at least one of the edges connecting the nodes of the given node pair to any neighbor nodes common to that pair has a corresponding measure greater than or equal to the specified threshold. In this situation, the nodes of the node pair are not merged into a single node, as indicated in step 112.

Regardless of whether the nodes of the identified node pair are merged into a single node in step 108 or not merged into a single node in step 112, the process moves to step 114 to determine if there are any node pairs left to be processed. A given additional pair of nodes to be processed may include one or more single nodes determined during previous iterations of the process. In other words, one of the additional pairs determined in step 114 may comprise a single node resulting from a merging of the nodes of the previous pair in step 108.

As long as there is at least one additional pair of nodes to be processed, the process returns to step 104 to iterate another instance of the merging determination for a selected node pair. The outcome of a given iteration for which a node pair is merged may be viewed as a modified topology in that such a topology will contain fewer nodes and edges than the topology that existed prior to the merging of the node pair. Step 114 may be exited based on a designated condition, such as all of the remaining edges having associated measures that are greater than or equal to the specified threshold. Other designated conditions may be used, such as the number of nodes in the modified topology falling below a specified maximum number of nodes for a desired visualization. Designated conditions of this type, or a simple exhaustion of all possible node pairs, result in a negative determination in step 114. The process then moves to step 116 where the reduced network topology resulting from the last node merging operation of step 108 that was performed prior to the exiting of step 114 is utilized to generate a visualization, to perform network analysis, or in another application.

For example, a visualization of the reduced network topology may be generated in step 116 by generating one or more graphics images for presentation on a computer monitor or other type of display. Such a graphic image or images may comprise various visual representations of the nodes and edges of the reduced topology, generated using an otherwise conventional network analysis software tool or other type of network analysis device. Numerous techniques for generating images or other representations of this type are well understood in the art and therefore not described in further detail herein.

The node merging process of FIG. 1 generates a representation of the reduced network topology, and the visualization mentioned above is just one example of such a representation. Another example of a representation of reduced network topology is one in the form of a designated data structure, such as a list of nodes and a corresponding adjacency matrix specifying connections between the nodes.

Other applications that may make use of a reduced network topology representation generated using the node merging process of FIG. 1 include, for example, network implementation, maintenance, management, monitoring or troubleshooting. As a more specific example, a representation of reduced network topology may be used to determine performance problem locations in a network in the manner described in U.S. Patent Application Publication No. 2005/0053009, entitled "Method and Apparatus for Automatic Determination of Performance Problem Locations in a Network," which is commonly assigned herewith and incorporated by reference herein.

It should be noted that the underlying physical network is unchanged as a result of the node merging process. The nodes of a given topology representative of the network are merged in generating successive modified topologies, each of which is representative of the same underlying physical network.

The illustrative node merging process described above is particularly well-suited for use in simplifying a network topology visualization such that it automatically presents only those nodes and edges likely to represent WAN components of the network. The described techniques can thus simplify the visualization of a network topology by reducing it to its likely WAN components. Accordingly, the illustrative embodiment overcomes the significant problems with conventional practice as previously described herein.

The threshold utilized in step 110 can be controlled by the user to produce various levels of simplification. In the above-noted WAN application, a suitable threshold for use with traceroute delay measures may be on the order of 5 milliseconds, and more generally between about 1 and 20 milliseconds. Of course, other types of thresholds or decision points can be used, and will generally vary depending upon the particular types of statistics or other measures that are associated with the respective edges in the network topology. Other embodiments of the invention can utilize any type of statistic or other measure obtained using any type of technique in conjunction with a reduction of the network topology for simplifying visualization.

In a given embodiment, the threshold could be adjustable via a slider or other similar control element accessible to the user via a graphical user interface. For example, different parts of the topology could be merged at different thresholds, thereby revealing the parts of the topology where the edge statistics are higher. The user can move the threshold adjustment slider back and forth to visualize the result of the change in real time. Such an approach can reveal interesting aspects of the topology and its edge statistics. As one possible alternative, a designated sequence of automatic threshold adjustments could be predetermined for use in particular situations or to detect particular types of network characteristics.

It is to be appreciated that the particular arrangement of processing steps in FIG. 1 is presented by way of illustrative example only. Numerous alternative arrangements of processing steps may be used to generate simplified representations of network topology using the techniques disclosed herein.

Figure 2:
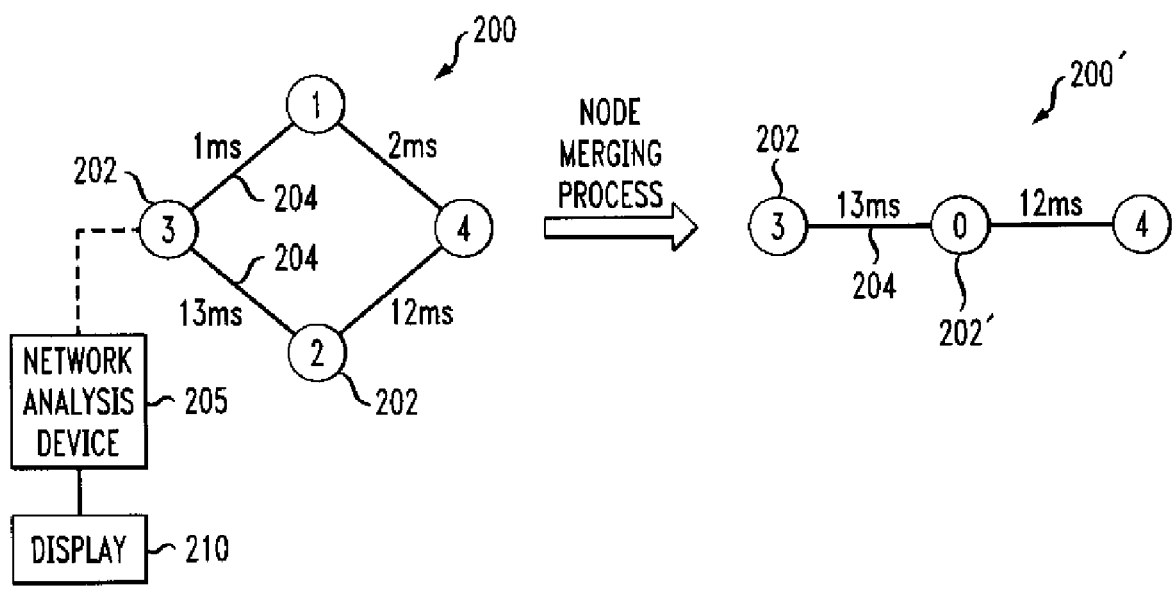
FIG. 2 shows a simple example of a portion of a network in which the node merging process of FIG. 1 is implemented.

FIG. 2 shows a portion of a network 200 in which the above-described node merging process for generating a simplified visualization of network topology is implemented. The portion of the network as shown is simplified for clarity of illustration, and the disclosed techniques may be applied to networks of much greater complexity. The network 200 as shown has a topology that includes a plurality of network elements 202 interconnected by links 204. The network elements 202 comprise nodes identified as Node 1, Node 2, Node 3 and Node 4. These nodes may comprise routers, switches, gateways or other processing elements of the network 200, in any combination. Generally, such a processing element may comprise a processor, a memory and a network interface, as will be described in greater detail below in conjunction with FIG. 4. The links 204 may be viewed as examples of what are more generally referred to herein as "edges."

The network 200 may represent, for example, a global communication network such as the Internet, a wide area network, a metropolitan area network, a local area network, a wireless cellular network, a public switched telephone network (PSTN), or a satellite network, as well as portions or combinations of these or other communication networks. As indicated above, the network 200 may comprise conventional routers, switches, gateways or other processing elements.

The network 200 further includes a network analysis device 205 which is illustratively shown as being coupled to at least one of the nodes, namely Node 3. This network analysis device controls the performance of at least a portion of the node merging process of FIG. 1. For example, it may initiate performance of one or more instances of the traceroute program from a given node, and analyze the resulting performance data in accordance with step 100 of the process in order to determine an initial network topology. Alternatively, the network analysis device may determine an initial network topology using other techniques, such as by obtaining the corresponding information from an external source.

In other embodiments the network analysis device may also or alternatively communicate with one or more other nodes of the network, such as Node 1, Node 2 and Node 4. The network analysis device 205 in this embodiment is coupled to a display 210 that is used to present a visualization of a reduced network topology determined in the manner described above. The network analysis device and its associated display may be entirely separate from the network 200 in other embodiments. For example, information indicating the initial topology of network 200 and the corresponding edge measures may be provided through any known communication mechanism to a separate and unrelated network analysis device for further processing.

It should be noted that, although shown as a stand-alone device in the exemplary network 200 of FIG. 2, the network analysis device 205 may alternatively be incorporated in whole or in part into one or more of the network elements. Thus, a visualization simplification capability such as that associated with steps 100 through 116 in FIG. 1 may be incorporated into an otherwise conventional router, switch, gateway or other network element. Also, the traceroute program may run, for example, entirely on a network element coupled to the network analysis device, or partly on the network analysis device and partly on the network element.

Thus, the particular configuration shown in the figure is presented by way of illustrative example only. Again, use of the traceroute program is for purposes of illustration only, and any other source of network topology information may be used.

The numbers shown adjacent the respective links 204 in the network 200 indicate the corresponding delay measures for the present example, in milliseconds. The traceroute program is used to route packets from a source node towards a destination node in the manner previously described. That is, three packets are transmitted for each TTL value, and the TTL values are monotonically increased. This leads to determination of delay measures as shown. A delay of 1 millisecond is associated with the route from Node 3 to Node 1, a delay of 13 milliseconds is associated with the route from Node 3 to Node 2, a delay of 2 milliseconds is associated with the route from Node 1 to Node 4, and a delay of 12 milliseconds is associated with the route from Node 2 to Node 4.

The nodes and edges shown on the left hand side of the diagram of FIG. 2 may be viewed as representing an initial network topology of the type determined in step 100 of FIG. 1. Also shown in FIG. 2, on the right hand side of the diagram, is a modified network topology 200' that results from merging of a pair of nodes in the initial topology. As indicated above, both topologies are representative of the same underlying physical network, which does not change as a result of the node merging process.

Assume for this example that the specified threshold referred to in step 110 of FIG. 1 is 15 milliseconds, and that the node pair being processed is the pair (Node 1, Node 2). These nodes share common neighbor nodes Node 3 and Node 4, and all of the edges to these common neighbor nodes have measures (1, 2, 12 and 13 milliseconds) that are less than the specified threshold of 15 milliseconds. Thus, the pair of nodes (Node 1, Node 2) can be merged into a single node. This single node resulting from the merger of Node 1 and Node 2 is node 202' in the modified topology 200', and is also denoted as Node 0. In conjunction with the merger of Nodes 1 and 2 into new Node 0, the edges between the merged nodes and the remaining Nodes 3 and 4 are removed from the topology and new edges are formed to the new Node 0. The measure assigned to a given new edge is determined in this example as the maximum of the associated measures of the edges that are replaced by the new edge. Thus, the new edge between Node 3 and Node 0 has a delay measure of 13 milliseconds, which is the maximum measure of the removed edges between Node 3 and Node 1, and Node 3 and Node 2. Similarly, the new edge between Node 0 and Node 4 has a delay measure of 12 milliseconds, which is the maximum measure of the removed edges between Node 1 and Node 4, and Node 2 and Node 4.

It should be emphasized that the simplified configuration of the network 200 as shown in FIG. 2 is for purposes of illustration only, and should not be construed as limiting the invention to any particular arrangement of elements. For example, the network 200 may include additional elements, comprising other types and arrangements of routing elements, switching elements or other types of processing elements.

FIG. 3 shows a set of pseudocode for implementing at least a portion of the node merging process described above. In this example, the node merging process examines each edge having an associated statistic below a specified WAN threshold, that is, a threshold that is able to distinguish likely WAN components of the network from non-WAN components. Edges associated with endpoints in the topology are skipped. As indicated above, when nodes of a given node pair are merged into a single node, the edges between the merged nodes and the remaining nodes are removed from the topology and new edges are formed to the new node. Again, the statistic assigned to a given new edge is determined in this example as the maximum of the associated statistics of the edges that are replaced by the new edge.

In other embodiments, different merging techniques may be used. For example, one alternative embodiment of the node merging process may merge nodes of a node pair if all edges connecting those nodes to common neighbor nodes are above a threshold. Such an embodiment may not merge nodes only when some of the connecting edges are below the threshold and others are above the threshold, that is, in the case of mismatched edges relative to the threshold. Numerous other alternatives are possible.

As indicated previously, the techniques of the present invention can be used to facilitate identification of performance problem locations in a network. Such techniques may be implemented in or otherwise used in conjunction with known approaches to determining performance problem locations in a network. See, for example, the above-cited U.S. Patent Application Publication No. 2005/0053009.

Accordingly, a given embodiment of the invention may be in the form of a method, apparatus or system for locating a performance problem in a network, with the location being determined utilizing information associated with a reduced network topology or a simplified visualization thereof as described herein. Other embodiments of the present invention may involve, for example, altering the operation of a network, generating a report, alert or other indicator and emailing or otherwise providing that indicator to a network administrator, or taking other real-time or non-real-time actions based on information associated with a reduced network topology or a simplified visualization thereof.

Figure 4:
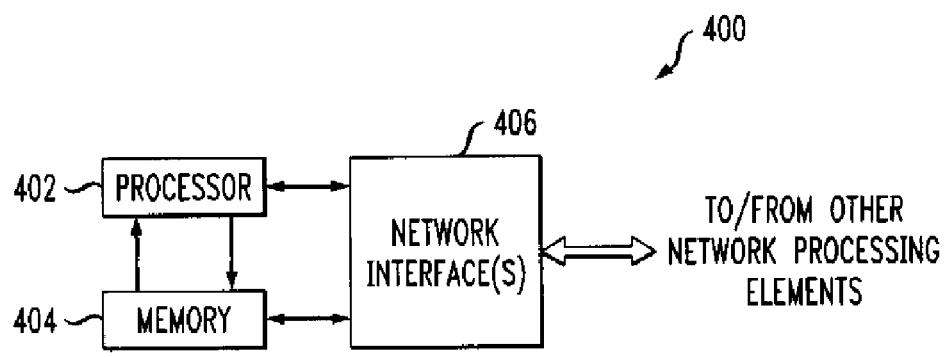
FIG. 4 is a block diagram showing one possible implementation of a given network analysis device, router or other processing element of the FIG. 2 network.

FIG. 4 shows an example of a given processing element 400 of the network 200. This processing element may be viewed as representing at least a portion of one or more of the nodes 202, the network analysis device 205, the display 210, or a combination of these elements.

The processing element 400 as shown in the figure includes a processor 402 coupled to a memory 404 and one or more network interfaces 406. The techniques of the present invention may be implemented at least in part in the form of software storable in the memory 404 and executable by the processor 402. The memory 404 may represent random access memory (RAM), read-only memory (ROM), optical or magnetic disk-based storage, or other storage elements, as well as combinations thereof.

Those skilled in the art will recognize that the individual elements of FIG. 4 as shown for illustrative purposes may be combined into or distributed across one or more processing devices, e.g., a microprocessor, an application-specific integrated circuit (ASIC), a computer or other device(s).

The FIG. 4 arrangement is considerably simplified for purposes of illustration. For example, if viewed as representative of a router, switch or other network element, the processing element 400 may include conventional elements typically associated with such a device, for example, elements associated with providing router functionality or switch functionality. Similarly, if viewed as representative of network analysis device 205 and associated display 210, the processing element 400 may comprise input devices such as a mouse or keyboard, as well as additional output devices other than display 210, such as a storage device or printer.

As mentioned above, one or more of the operations associated with a node merging process as described above in conjunction with the illustrative embodiments may be implemented in whole or in part in software utilizing processor 402 and memory 404 associated with a network processing element. Other suitable arrangements of hardware, firmware or software may be used to implement the techniques of the invention.

It should again be emphasized that the above-described arrangements are illustrative only. For example, alternative embodiments may involve different types of performance data, statistics or other measures, and different thresholds or other decision techniques for identifying conditions under which nodes should or should not be merged. Also, the particular processing steps associated with the node merging process in the illustrative embodiments may be varied. Furthermore, the particular assumptions used in the context of describing the illustrative embodiments should not be viewed as requirements of the invention, and embodiments may be constructed in which one or more of these assumptions do not apply. These and numerous other alternative embodiments within the scope of the following claims will be apparent to those skilled in the art.

What is claimed is:

1. A method comprising:
   transmitting, from a first network element to a second network element, one or more packets to obtain a first network topology;
   identifying, at the first network element, a pair of nodes from the first network topology;
   merging, at the first network element, the pair of nodes identified from the first network topology, wherein merging the pair of nodes is based, at least in part, on:
   i. determining that an intermediary node connects a first node to a second node of the pair of nodes,
   ii. determining that a first value of a first edge satisfies a threshold, wherein the first edge connects the first node to the intermediary node, and
   iii. determining that a second value of a second edge satisfies the threshold, wherein the second edge connects the second node to the intermediary node;
   wherein if:
   i. the first value is greater than the second value, assigning the first value to a third edge that connects the intermediary node to the merged pair of nodes, and
   ii. the first value is less than the second value, assigning the second value to the third edge that connects the intermediary node to the merged pair of nodes; and
   generating, at the first network element, a representation of a second network topology based, at least in part, on merging the pair of nodes from the first topology.

2. The method of claim 1, wherein generating the representation of the second network topology comprises generating a graphical representation of the second network topology, and, displaying the graphical representation of the second network topology on a display.

3. The method of claim 1 further comprising analyzing the second network topology, and, transmitting an indicator to a network administrator when a location of a performance problem is detected in the second network topology.

4. The method of claim 1, wherein the one or more packets are transmitted based, at least in part, on executing a route tracing program at one or more network elements.

5. The method of claim 1 further comprising, merging the first node and the second node if the first node and the second node do not share at least one intermediary node.

6. The method of claim 1, wherein the first value and the second value satisfies the threshold when:
   i. the first value is less than the threshold, and
   ii. the second value is less than the threshold.

7. The method of claim 1, wherein the first node and the second node are not merged together when:
   i. the first value is greater than or equal to the threshold, and
   ii. the second value is greater than or equal to the threshold.

8. The method of claim 1, wherein the threshold comprises a wide area network threshold, and, wherein the second network topology only represents a portion of the network that is associated with a wide area network.

9. The method of claim 1, wherein merging the first node and the second node to obtain the second network topology comprises removing the first edge and the second edge to form the third edge.

10. The method of claim 1, wherein the first value and the second value comprises at least one of a delay measurement, a loss measurement, and a jitter measurement.

11. The method of claim 1 further comprising analyzing the second network topology, and, altering operations of the network based, at least in part, on locating a performance problem in the second network topology.

12. The method of claim 1, wherein the second network topology comprises less nodes and less edges than the first network topology.

13. A computer-readable storage medium containing software code for implementing the steps of the method of claim 1.

14. An apparatus comprising:
   a processing element comprising a processor and a memory, the memory being coupled to the processor;
   wherein the processing element under control of the processor is operative to:
   transmit one or more packets in a network to obtain a first network topology;
   identify a pair of nodes in the first network topology, wherein the pair of nodes comprises a first node and a second node;
   merge the pair of nodes to obtain a second network topology based, at least in part, on:
   i. determining that an intermediary node connects the first node to the second node,
   ii. determining that a first value of a first edge connecting the first node to the intermediary node satisfies a threshold, and
   iii. determining that a second value of a second edge connecting the second node to the intermediary node satisfies the threshold;
   wherein if:
   i. the first value is greater than the second value, assigning the first value to a third edge that connects the intermediary node to the merged pair of nodes, and
   ii. the first value is less than the second value, assigning the second value to the third edge that connects the intermediary node to the merged pair of nodes; and
   generate a representation of the second network topology.

15. The apparatus of claim 14, wherein the apparatus is implemented at least in part within a network analysis device coupled to a first network element.

16. The apparatus of claim 14, wherein the apparatus is implemented at least in part within a first network element.

17. The apparatus of claim 16, wherein the first network element comprises at least one of a router and a switch.

18. A network comprising:
   a plurality of interconnected network elements; and
   a processing element associated with at least one of the network elements;
   wherein the processing element is operative to:
   transmit one or more packets in a network to obtain a first network topology;
   identify a pair of nodes in the first network topology, wherein the pair of nodes comprises a first node and a second node;

merge the pair of nodes to obtain a second network topology based, at least in part, on:

i. determining that an intermediary node connects the first node to the second node, ii. determining that a first value of a first edge connecting the first node to the intermediary node satisfies a threshold, and iii. determining that a second value of a second edge connecting the second node to the intermediary node satisfies the threshold;

wherein if:
  i. the first value is greater than the second value, assigning the first value to a third edge that connects the intermediary node to the merged pair of nodes, and
  ii. the first value is less than the second value, assigning the second value to the third edge that connects the intermediary node to the merged pair of nodes; and
generate a representation of the second network topology.

19. The network of claim 18, wherein the processing element is implemented at least in part in a network analysis device coupled to one of the network elements.

* * * * *